(12) United States Patent
Nakajima et al.

(10) Patent No.: US 8,289,130 B2
(45) Date of Patent: Oct. 16, 2012

(54) SYSTEMS AND METHODS FOR IDENTIFYING UNAUTHORIZED USERS OF AN ELECTRONIC DEVICE

(75) Inventors: Taido L. Nakajima, Cupertino, CA (US); Pareet Rahul, Markham (CA); Gloria Lin, San Ramon, CA (US)

(73) Assignee: Apple Inc., Cupertino, CA (US)

( * ) Notice: Subject to any disclaimer, the term of this patent is extended or adjusted under 35 U.S.C. 154(b) by 690 days.

(21) Appl. No.: 12/389,106

(22) Filed: Feb. 19, 2009

(65) Prior Publication Data
US 2010/0207721 A1    Aug. 19, 2010

(51) Int. Cl.
*G05B 19/00* (2006.01)
(52) U.S. Cl. .............. 340/5.3; 340/572.1; 455/411
(58) Field of Classification Search ............. 340/5.3, 340/572.1; 709/222; 455/411
See application file for complete search history.

(56) References Cited

U.S. PATENT DOCUMENTS

| | | | |
|---|---|---|---|
| 6,725,379 B1 * | 4/2004 | Dailey | 726/35 |
| 6,975,204 B1 * | 12/2005 | Silver | 340/5.31 |
| 7,047,426 B1 * | 5/2006 | Andrews et al. | 713/155 |
| 7,844,247 B2 * | 11/2010 | Chen et al. | 455/404.1 |
| 7,996,023 B2 * | 8/2011 | McGary et al. | 455/466 |
| 2003/0005316 A1 * | 1/2003 | Girard | 713/193 |
| 2003/0181219 A1 * | 9/2003 | Huang | 455/558 |
| 2005/0073389 A1 * | 4/2005 | Chandley | 340/5.31 |
| 2008/0034224 A1 * | 2/2008 | Ferren et al. | 713/193 |
| 2008/0079581 A1 * | 4/2008 | Price | 340/572.1 |
| 2008/0301820 A1 * | 12/2008 | Stevens | 726/28 |
| 2009/0247122 A1 * | 10/2009 | Fitzgerald et al. | 455/410 |
| 2009/0253406 A1 * | 10/2009 | Fitzgerald et al. | 455/410 |

* cited by examiner

*Primary Examiner* — Eric M Blount
(74) *Attorney, Agent, or Firm* — Womble Carlyle Sandridge & Rice LLP

(57) ABSTRACT

This is generally directed to identifying unauthorized users of an electronic device. In some embodiments, an unauthorized user of the electronic device can be detected by identifying particular activities that may indicate suspicious behavior. In some embodiments, an unauthorized user can be detected by comparing the identity of the current user to the identity of the owner of the electronic device. When an unauthorized user is detected, various safety measures can be taken. For example, information related to the identity of the unauthorized user, the unauthorized user's operation of the electronic device, or the current location of the electronic device can be gathered. As another example, functions of the electronic device can be restricted. In some embodiments, the owner of the electronic device can be notified of the unauthorized user by sending an alert notification through any suitable medium, such as, for example, a voice mail, e-mail, or text message.

30 Claims, 6 Drawing Sheets

| USER | DATE | PHONE CALLS | APPLICATIONS |
|---|---|---|---|
|  | FRI, JAN 2, 2009 10:25PM | | TEXT MESSAGES VOICEMAIL PHONE CALL HISTORY |
|  | SAT, JAN 3, 2009 9:43AM | HENRY SMITH SUZIE LEE | |
|  | SAT, JAN 3, 2009 8:03 PM | JILL EDISON | INTERNET CONTACT BOOK |

SYSTEMS AND METHODS FOR IDENTIFYING UNAUTHORIZED USERS OF AN ELECTRONIC DEVICE

FIELD OF THE INVENTION

This relates to systems and methods for identifying unauthorized users of an electronic device. In particular, this relates to systems and methods for detecting an unauthorized user, gathering information related to the electronic device, the unauthorized user, or both, and transmitting an alert notification to a responsible party for the electronic device.

BACKGROUND OF THE INVENTION

People often possess and carry around a variety of electronic devices, such as, for example, cellular phones, PDA's, personal e-mail or messaging devices (e.g., a Blackberry™), and handheld media players (e.g., an iPod™). Many of these electronic devices are used frequently by their owners, and the electronic devices may contain personal or sensitive information stored within them. For example, the electronic devices may contain information such as credit card numbers, passwords, social security numbers, bank information, contact lists, or calendar information. Accordingly, if the electronic device is lost or stolen, the loss of the electronic device can be exceedingly disruptive to the owner's peace of mind and security. Thus, the owner may desire to find out where the lost electronic device is located or who may have gained possession of or stolen the electronic device.

SUMMARY OF THE INVENTION

Systems and methods for identifying unauthorized users of an electronic device are provided. In particular, systems and methods for detecting an unauthorized user, gathering information related to the electronic device, the unauthorized user, or both, and transmitting an alert notification to a responsible party for the electronic device are provided.

In some embodiments, an unauthorized user can be detected by comparing the identity of the current user to the identities of authorized users of the electronic device. For example, a photograph of the current user can be taken, a recording of the current user's voice can be recorded, the heartbeat of the current user can be recorded, or any combination of the above. The photograph, recording, or heartbeat can be compared, respectively, to a photograph, recording, or heartbeat of authorized users of the electronic device to determine whether they match. If they do not match, the current user can be detected as an unauthorized user.

In some embodiments, an unauthorized user can be detected by noting particular activities that can indicate suspicious behavior. For example, activities such as entering an incorrect password a predetermined number of times in a row, hacking of the electronic device, jailbreaking of the electronic device, unlocking of the electronic device, removing a SIM card from the electronic device, or moving a predetermined distance away from a synced device can be used to detect an unauthorized user.

In some embodiments, when an unauthorized user is detected, information related to the current user of the electronic device (e.g., the unauthorized user), the current user's operation of the electronic device, the electronic device's location, or any combination of the above can be gathered. For example, information such as the current's user's photograph, a voice recording of the current user, screenshots of the electronic device, keylogs of electronic device, communication packets (e.g., Internet packets) served to the electronic device, location coordinates of the electronic device, or geotagged photos of the surrounding area can be gathered.

Instead or in addition, when an unauthorized user is detected, various functions of the electronic device can be restricted. For example, access to particular applications can be restricted, access to sensitive information can be restricted, sensitive information can be erased from the electronic device, or any combination of the above.

In some embodiments, an alert notification can be sent to a responsible party when an unauthorized user is detected. The "responsible party" can be any persons suitable to receive the alert notification, such as, for example, the owner of the electronic device, proper authorities or police, persons listed in a contact book in the electronic device, or any combination of the above. In some embodiments, the alert notification can be a general warning that an unauthorized user has been detected (e.g., "Warning, your electronic device may have been stolen"). In some embodiments, the alert notification can contain any of the information gathered in response to an unauthorized user being detected (e.g., photographs, voice recordings, screenshots, geotagged photographs, or any other gathered information).

The alert notification can be transmitted to the responsible party through any suitable medium. For example, the alert notification can be sent as a voicemail, phone call, text message, e-mail, or facsimile. As another example, the alert notification can be sent through any suitable VoIP application (e.g., Skype™ or Windows™ Live Messenger), instant messaging application (e.g., AOL Instant Messenger™ or MSN Messenger™), on-line profile application (e.g., Facebook™ or Friendster™), blog application (e.g., Twitter or Xanga™), or "cloud" server (e.g., sent to a Mobile Me account associated with the owner of the electronic device).

BRIEF DESCRIPTION OF THE FIGURES

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
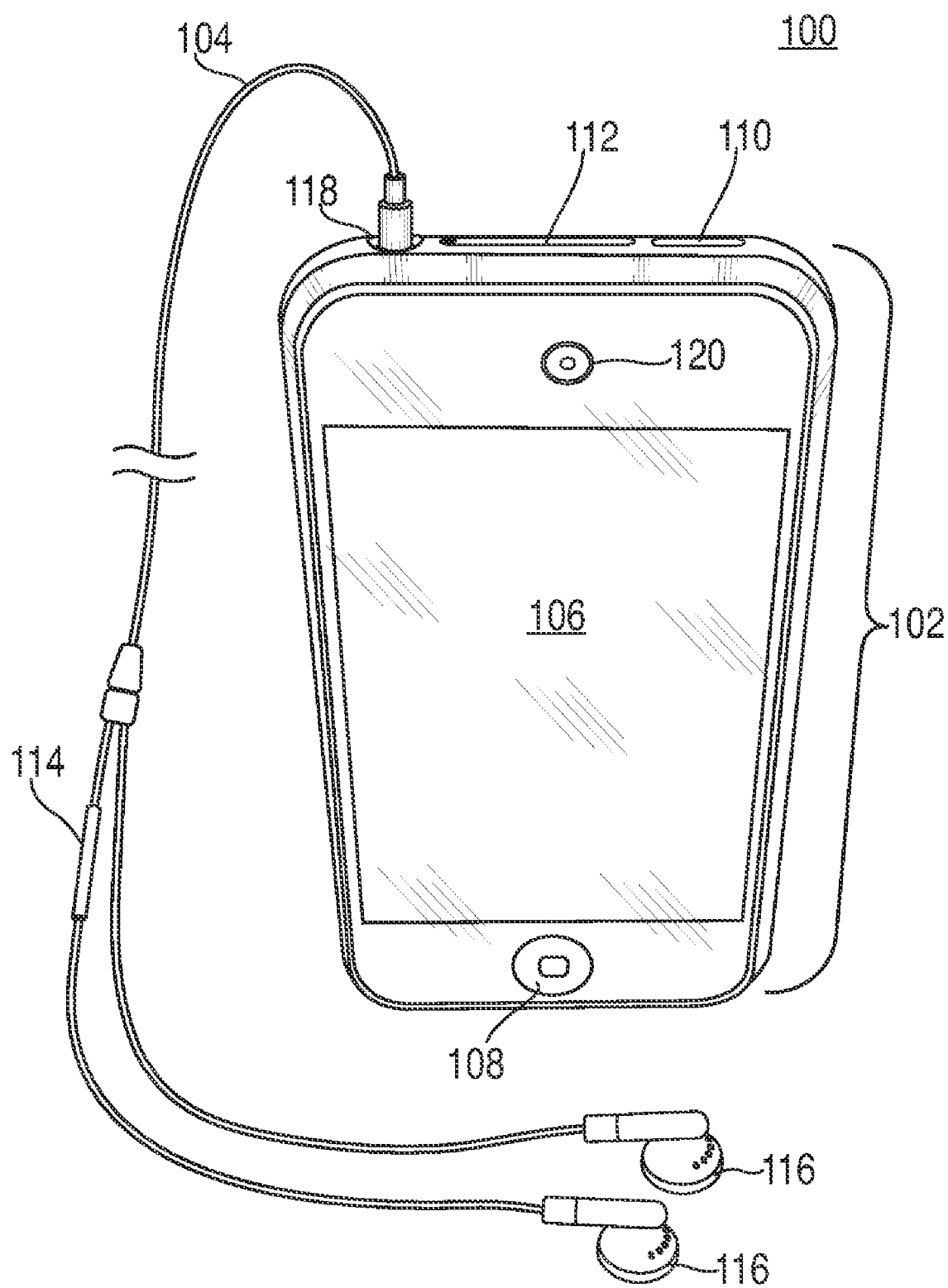
FIG. 1 shows an illustrative electronic device in accordance with some embodiments of the present invention.

FIG. 1 shows illustrative electronic device 100 that is in accordance with some embodiments of the present invention. In some embodiments, electronic device 100 can include, for example, a cellular phone which can communicate over a cellular network. In some embodiments, electronic device 100 can include a cellular phone that can communicate through a non-cellular network system, such as Voice Over Internet Protocol (VoIP). Furthermore, although generally depicted as a portable, handheld device and as having a particular shape and design in FIG. 1, one skilled in the art could appreciate that electronic device 100 can include any suitable size, shape, or design. For example, in some embodiments, electronic device 100 can be a non-handheld device such as a desktop computer, a handheld device such as personal data assistant ("PDA"), a personal e-mail or messaging device (e.g., a Blackberry® or a Sidekick®), a handheld media player such as an iPod™ (available from Apple Inc. of Cupertino, Calif.), a laptop computer, or any other suitable device. When a cellular phone is discussed below, one skilled in the art could appreciate that any of the above-mentioned electronic devices could alternatively be utilized.

Electronic device 100 can include main device 102 and one or more of accessory device 104. Generally, any of the components of electronic device 100 described below can be integrated into main device 102, contained in accessory device 104, or both. Additionally, although accessory device 104 is depicted as being physically coupled to main device 102 in FIG. 1, accessory device 104 may alternatively be wirelessly coupled to main device 102.

There can be multiple ways of connecting accessory device 104 to main device 102 through, for example, connector 118. Persons skilled in the art will appreciate that connector 118 can be any suitable connector such as one or more USB ports, 30-pin connector ports, docks, expansion ports, and headset jacks.

Electronic device 100 can include display screen 106. Further to the discussion above, display screen 106 does not need to be integrated into main device 102, and in other embodiments can be an accessory device that is physically or wirelessly coupled to main device 102. For example, display screen 106 can include a computer monitor, a television screen, a projection screen, a liquid crystal display ("LCD"), light emitting diode ("LED") display, organic light-emitting diode ("OLED") display, surface-conduction electron-emitter display ("SED"), carbon nanotubes, nanocrystal displays, or any other suitable screen. Display screen 106 can present various types of information to the user such as graphical and textual displays. In some embodiments, display screen 106 can function as a user input mechanism that allows for a touch screen or user input via a stylus.

Electronic device 100 can also include one or more of user input mechanisms 108 and 110. These mechanisms can include, for example, one or more buttons, switches, track wheels, click wheels, or keyboards. Electronic device 100 can include one or more of port 112 for coupling external data or hard drives into electronic device 100. For example, port 112 can enable electronic device 100 to receive SIM cards, flash drives, or external hard drives.

Electronic device 100 can include any suitable user input/output devices such as microphone 114 and one or more of speaker 116. Although depicted as being integrated into accessory device 104, one skilled in the art could appreciate that microphone 114 and speakers 116 may alternatively or additionally be contained in main device 102.

Electronic device 100 can include one or more of camera 120. Similar to the above-mentioned components, camera 120 can be integrated into main device 102 or can additionally or alternatively be integrated into accessory device 104. Camera 120 can be used as an input device to capture visual images (e.g., photos). Visual images that are captured by camera 120 can be, for example, stored in memory within electronic device 100, transmitted over a communications network to another electronic device, edited, or processed in any other suitable way. Camera 120 can be oriented in any suitable manner, including for example facing towards or away from the user when the user looks at screen 106.

Figure 2:
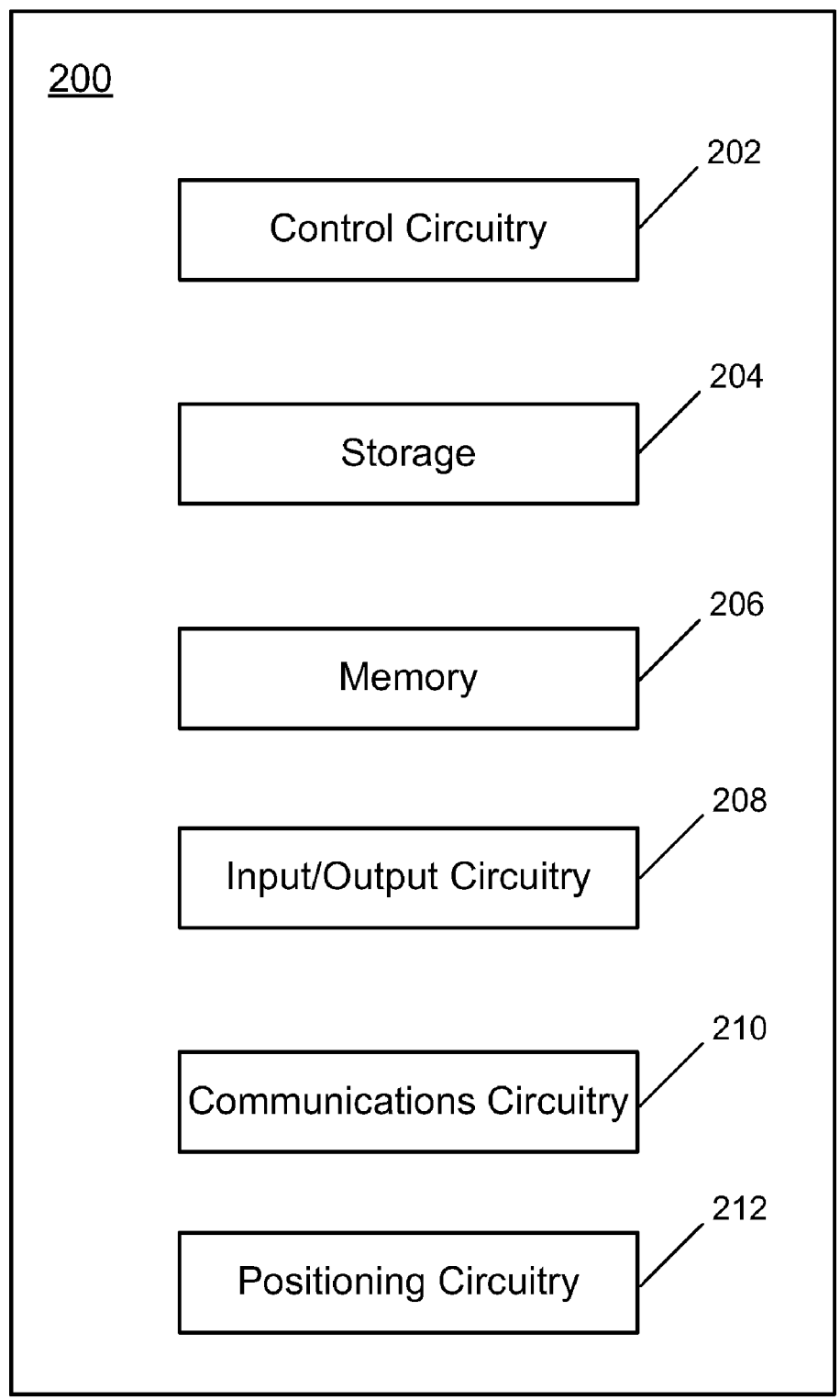
FIG. 2 shows a schematic view of an illustrative electronic device in accordance with some embodiments of the present invention.

FIG. 2 shows a schematic view of an illustrative electronic device in accordance with some embodiments of the invention. For example, electronic device 200 can correspond to electronic device 100 of FIG. 1. Electronic device 200 can include control circuitry 202, storage 204, memory 206, input/output circuitry 208, communications circuitry 210, and positioning circuitry 212. In some embodiments, one or more of electronic device components 200 can be combined or omitted (e.g., storage 204 and memory 206 can be combined). In some embodiments, electronic device 200 can include other components not combined or included in those shown in FIG. 2 (e.g., motion detection components, a power supply, or a bus), or several instances of the components shown in FIG. 2. For the sake of simplicity, only one of each of the components is shown in FIG. 2.

Control circuitry 202 can include any processing circuitry or processor operative to control the operations and performance of electronic device 200. For example, control circuitry 200 can be used to run operating system applications, firmware applications, media playback applications, or any other application. In some embodiments, the control circuitry can drive a display and process inputs received from a user interface.

Storage 204 and memory 206 can include, for example, one or more storage mediums including a hard-drive, solid state drive, flash memory, permanent memory such as ROM, cache memory, semi-permanent memory such as RAM, or any other suitable type of storage component, or any combination thereof. One or both of storage 204 and memory 206 can store, for example, media data (e.g., music, picture, and video files), application data (e.g., for implementing functions on electronic device 200), firmware, user preference information data (e.g., contact lists), authentication information (e.g. libraries of data associated with authorized users), wireless connection information data (e.g., information that can enable electronic device 200 to establish a wireless connection), and any other suitable data or any combination thereof. In some embodiments, memory 206 and storage 204 can be combined as a single storage medium.

Input/output circuitry 208 can be operative to convert (and encode/decode, if necessary) analog signals and other signals into digital data, and vice-versa. For example, input/output circuitry 208 can be operative to convert signals received from any suitable input device such as, for example, an accelerometer, magnetometer, photodetector, or input mechanisms 108 and 110 of FIG. 1, into digital data. As another example, input/output circuitry 208 can convert signals received from input devices such as microphone 114 and camera 120 of FIG. 1.

Communications circuitry 210 can include any suitable communications circuitry operative to connect to a communications network and transmit or receive communications (e.g., data) with electronic device 200. Communications circuitry 210 can be operative to interface with a communications network using any suitable communications protocol such as, for example, Wi-Fi (e.g., a 802.11 protocol), Bluetooth®, near field communications ("NFC"), radio frequency systems (e.g., 900 MHz, 2.4 GHz, and 5.6 GHz communication systems), infrared, GSM, GSM plus EDGE, CDMA, quadband, other cellular protocols, VOIP, or any other suitable protocol. In some embodiments, communications circuitry 210 can enable electronic device 200 to be coupled to a host device or to another electronic device. Electronic device 200 can be coupled to perform functions such as, for example, data transfers, synching the electronic device, software updates, or any other suitable operation.

Positioning circuitry 212 can include any suitable circuitry for determining the current location of electronic device 200. In some embodiments, positioning circuitry 212 can include a global positioning system ("GPS") that returns the geographic location (e.g., the longitude and latitude coordinates) of electronic device 200. In some embodiments, the current location can be derived from any suitable trilateration or triangulation technique. For example, the device can determine its location using various measurements (e.g., signal-to-noise ratio ("SNR") or signal strength) of a network signal (e.g., a cellular telephone network signal) associated with the device. Other forms of wireless-assisted GPS (sometimes referred to herein as enhanced GPS or A-GPS) can also be used to determine the current position of electronic device 200. In some embodiments, a device can determine its location based on a wireless network or access point that is in range or a wireless network or access point to which the device is currently connected.

In some embodiments, electronic device 200 can include a bus operative to provide a data transfer path for transferring data to, from, or between control circuitry 202, storage 204, memory 206, input/output circuitry 208, communications circuitry 210, and any other component included in electronic device 200.

Figure 3:
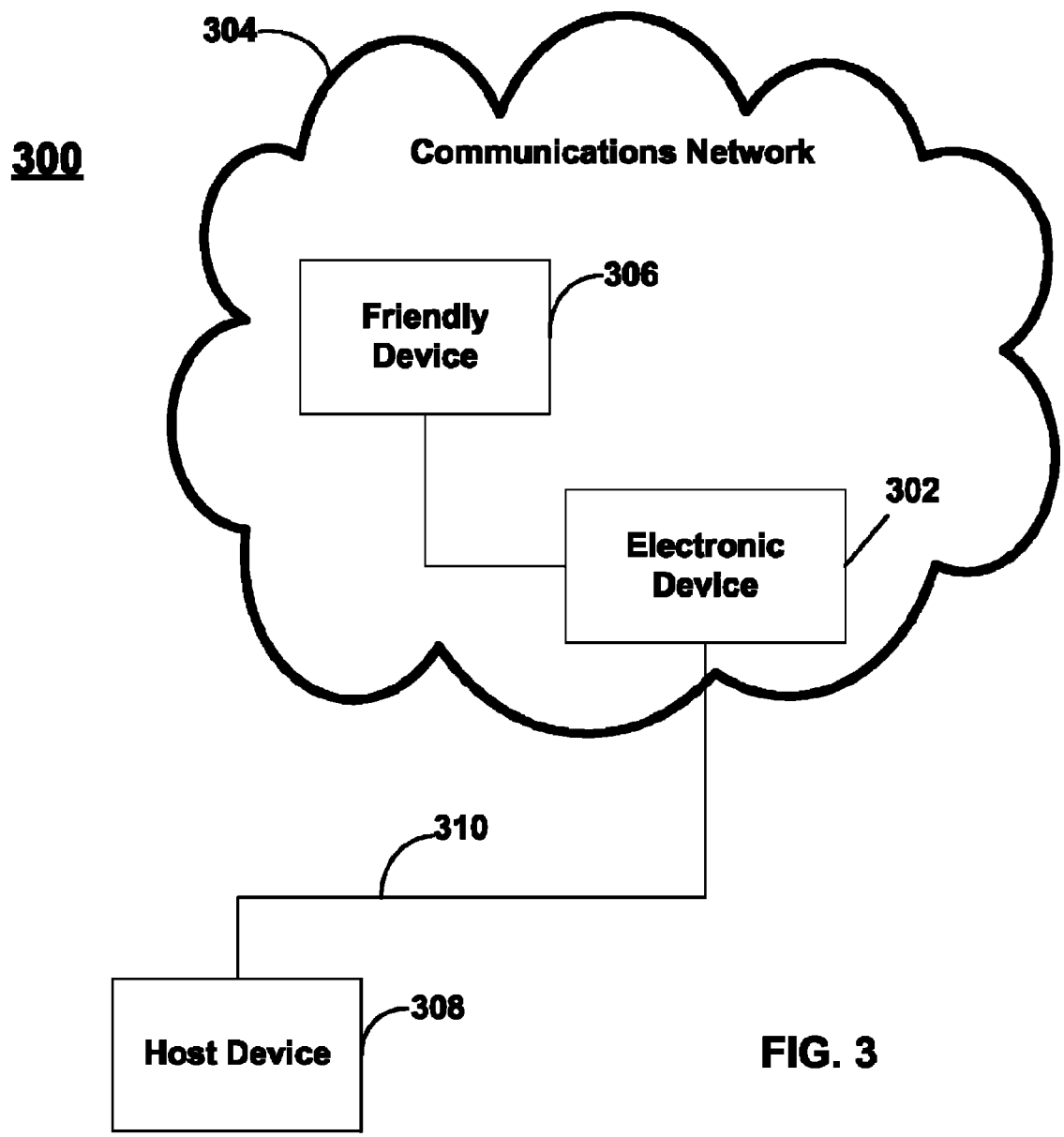
FIG. 3 shows a schematic view of an illustrative communications system in accordance with some embodiments of the invention.

FIG. 3 is a schematic view of communications system 300 in accordance with some embodiments of the present invention. Communications system 300 can include electronic device 302 coupled to communications network 304. For example, electronic device 302 can correspond to electronic device 100 of FIG. 1. Electronic device 302 can use communications network 304 to perform wireless or wired communications with other devices within communications network 304, such as friendly device 306. Friendly device 306 can include any suitable device in communication with electronic device 302 such as, for example, a cellular phone, a computer, a remote server, a PDA, a personal e-mail or messaging device (e.g., a Blackberry® or a Sidekick®), a handheld media player such as an iPod™ (available from Apple Inc. of Cupertino, Calif.), or any other suitable device. Although communications system 300 can include several instances of electronic device 302 and friendly device 306, only one of each is shown in FIG. 3 for simplicity and clarity.

Any suitable circuitry, device, system, or combination of these components operative to create a communications network can be used to create communications network 304. In some embodiments, communications network 304 can support, for example, Wi-Fi (e.g., a 802.11 protocol), Bluetooth®, NFC, Internet servers, VoIP, radio frequency systems (e.g., 900 MHz, 2.4 GHz, and 5.6 GHz communication systems), infrared, GSM, GSM plus EDGE, CDMA, quadband, other cellular protocols, or any other suitable protocol.

Communications system 300 can include host device 308. Electronic device 302 can be coupled with host device 308 over communications link 310 using any suitable approach. For example, communications link 310 can include any suitable wireless communications protocol, wired link, or combination of the above. Electronic device 302 can be coupled to host device 308 to perform functions such as, for example, data transfers, synching electronic device 302 with host device 308, software updates, or any other suitable operation. Although only one instance of host device 308 is shown in FIG. 3, communications system 300 can alternatively include one or more instances of host device 308.

As mentioned above, this is generally directed to identifying unauthorized users of an electronic device. For example, in some embodiments, an unauthorized user of the electronic device can be detected (e.g., it can be detected that someone other than the owner of the electronic device has gained possession of or is using the electronic device). When the unauthorized user has been detected, various safety measures can be taken. For example, information related to the unauthorized user's identity or operation of the electronic device or information related to the current location of the electronic device can be gathered. In some embodiments, the owner can be notified that an unauthorized user has been detected by sending an alert notification through, for example, an e-mail, text message, facsimile, or any other suitable medium.

As used herein, the term "owner" refers to any authorized user of an electronic device. The term "owner" can apply to a person who owns or who has paid for the electronic device, to any persons who have permission or authorization to use that electronic device, or to both (e.g., an employer providing an electronic device to an employee). For example, an entire family may decide to share a single cellular phone. Although only one person in the family has paid for the phone, everyone in the family is an authorized user of the phone. Also, as used herein, the term "unauthorized user" or "thief" can apply to a person who has, for example, stolen an electronic device, found an electronic device that has been lost, or in any other manner picks up or attempts to use an electronic device which they are not authorized to use.

In some embodiments, to detect an unauthorized user of the electronic device, the identity of the current user can be determined. If the identity of the current user does not match the identity of the owner of the electronic device, the current user can be detected as an unauthorized user. For example, a face recognition system can be used to determine the current user's identity. The face recognition system can take a picture of the current user with a camera, such as camera 120 of FIG. 1. The picture can then be analyzed to determine whether or not the picture of the current user matches an authorized user. For example, the picture can be compared to images stored in a database of authorized users. If the picture of the current user does not match an authorized user, he can be detected as an unauthorized user. Various ways in which an electronic device can respond to detecting an unauthorized user will be discussed in more detail in the description and figures to follow.

As another example, a voice recognition system can be used to determine the current' user identity. In some embodiments, the current's user voice can be recorded through a microphone, such as microphone 114 of FIG. 1. The recording can then be analyzed to determine whether or not the recorded voice matches the voice of an authorized user (e.g., matches a "voice print" of an authorized user). Similar to the face recognition system, the recording can be compared to recordings of authorized users that are stored in a database. If the voice of the current user does not match the voice of an authorized user, the current user can be detected as an unauthorized user.

As another example, a heartbeat sensor can be used to determine the current user's identity. Generally, each person can have a unique heartbeat. For example, by analyzing the ratio between the high and low peaks measured in an electrocardiogram ("ECG") of a user's heart, a unique heartbeat "signature" that is distinctive to each user can be identified. Thus, by analyzing the heartbeat of the current user and comparing it to the owner's heartbeat, the electronic device can determine whether or not the current user matches an authorized user.

In some embodiments, to detect an unauthorized user of the electronic device, particular activities can be identified. As one example, the electronic device can monitor how many times in a row a current user enters an incorrect password, or how many times a current user enters an incorrect password within a certain amount of time. If the current user exceeds a predetermined threshold (e.g., if the current user enters an incorrect password more than three times in a row, or enters an incorrect password more than 3 times within one minute), it can be determined that he is an unauthorized user. Generally, an activity such as repeatedly entering incorrect passwords can indicate that the current user is not the owner and, rather, may be a person who is trying to hack into the electronic device.

As another example, an activity that can detect an unauthorized user can be any action that may indicate the electronic device is being tampered with by being, for example, hacked, jailbroken, or unlocked. For example, a sudden increase in memory usage of the electronic device can indicate that a hacking program is being run and that an unauthorized user may be using the electronic device. "Jailbreaking" of an electronic device can generally refer to tampering with the device to allow a user to gain access to digital resources that are normally hidden and protected from users. "Unlocking" of a cellular phone can generally refer to removing a restriction that "locks" a cellular phone so it may only be used in specific countries or with specific network providers. Thus, in some embodiments, an unauthorized user can be detected if it is determined that the electronic device is being jailbroken or unlocked. As yet another example of activities that can indicate tampering with the electronic device, an unauthorized user can be detected when a Subscriber Identity Module ("SIM") card is removed from or replaced in the electronic device.

In some embodiments, an unauthorized user can be detected when the electronic device moves a predetermined distance away from a device with which it has been synced through, for example, Bluetooth® pairing or Near Field Communications ("NFC"). For example, the electronic device may be synced with a wireless headset, a laptop, a security token device such as a key fob, a keychain, or any combination of the above. In some embodiments, if the electronic device moves a relatively short distance away from the synced device (e.g., 20 feet), the owner can be warned of the electronic device's movement. If the electronic device continues to move farther away from the synced device (e.g., 50 feet), a formal alert signaling that an unauthorized user has been detected can be generated. In this manner, since a warning is provided first, if the owner is responsible for moving the electronic device away from the synced device (e.g., as opposed to a thief who is stealing the electronic device), the owner may not be startled when the formal alert is generated but may disregard the formal alert.

As mentioned above, an unauthorized user can be detected by, for example, the output of an appropriate sensor or by identifying particular activities (e.g., by receiving a predetermined number of incorrect passwords, noting hacking, jailbreaking, unlocking, or removal of a SIM card, or moving a certain distance away from a synced device). Generally, when an unauthorized user is detected, various types of information can be gathered and a responsible party (e.g., the owner, the police, or the proper authorities) can be notified. Various ways of gathering information and notifying a responsible party will be described in more detail in the descriptions and figures to follow.

In some embodiments, when an unauthorized user is detected (e.g., by any of the above-mentioned ways), information related to the current user's identity or the current user's operation of the electronic device can be gathered. For example, a photograph of the current user can be taken with a camera, such as, for example, camera 120 of FIG. 1. In some embodiments, the photograph can be taken without a flash, any noise, or any indication that a picture is being taken to prevent the current user from knowing he is being photographed. As another example, a recording can be taken to capture the current user's voice through, for example, microphone 114 of FIG. 1. In some embodiments, the recording can be taken when the current user makes a phone call with the electronic device. In some embodiments, the electronic device can record any voices or sounds that are detected, regardless of whether or not a phone call is being made.

In some embodiments, when an unauthorized user is detected, information related to the current user's operation of the electronic device can be gathered (e.g., information related to the usage of the electronic device, as opposed to the mere entering of authentication information or turning-on of the electronic device. For example, keylogging software can be activated to record any keystrokes made by the current user. As another example, screenshots of the electronic device can be taken. As another example, the current user's Internet activity can be monitored or any communication packets that are served to the electronic device can be recorded. As another example, if the current user attempts to synchronize or couple the electronic device to a computer (or other host device), that computer's information can be gathered and recorded (e.g., the computer's IP address, Internet provider, and broadband service).

In some embodiments, when an unauthorized user is detected, the electronic device's location can be determined. For example, positioning circuitry, such as positioning circuitry 212 of FIG. 2, can use a GPS, a trilateration technique, a triangulation technique, a wireless-assisted GPS, or any combination of the above to determine the location coordinates of the electronic device. As another example, audio recordings of the surrounding area can be recorded and analyzed to determine the current location. In some embodiments, a photograph of the surrounding location can be taken and then "geotagged" by associating the photograph with the determined location coordinates. Photographs can be taken at regular intervals (e.g., every five minutes) to determine whether or not the electronic device is in the process of moving. In some embodiments, the current location can be determined by analyzing the photographs. For example, the photograph can be analyzed to detect distinguishing landmarks such as mountain ranges, constellations, street signs, stores, or any other suitable landmark. This technique can be beneficial in the event that, for example, alternate systems for determining the electronic device's location (e.g., a GPS system) are not available or cease functioning correctly.

In some embodiments, when an unauthorized user is detected, an accelerometer can be utilized to determine the mode of transportation of the electronic device. For example, the mode of transportation can be determined by utilizing a signal processing system to identify the "vibration profile" of any movement experienced by the electronic device. The vibration profile can be analyzed to determine whether it matches the vibration profile for movement types such as, for example, walking, running, riding on a train, riding in a car, flying in a plane, or riding on a bike.

In some embodiments, when an unauthorized user is detected, various functions of the electronic device can be restricted or prohibited. As one example, access to certain applications (e.g., contact books, Internet browsers, calendars, e-mail, or any other suitable application) can be restricted. As another example, access to sensitive information such as credit card information, social security numbers, banking information, home addresses, or any other delicate information can be prohibited. In some embodiments, the sensitive information can be erased from the electronic device. For example, the sensitive information can be erased directly after an unauthorized user is detected. However, as this may unfavorably erase information in response to a false detection (e.g., the electronic device malfunctions by incorrectly identifying the owner as an unauthorized user) and can be a nuisance to the owner, in some embodiments the information can be erased after a predetermined period of time (e.g., 48 hours) has passed. For example, if an unauthorized user has been detected, and the owner has not reclaimed possession of the electronic device within the predetermined period of time, the sensitive information can then be erased. In some embodiments, the sensitive information can be erased from the electronic device after being backed-up on a remote server. In this scenario, until a user is properly identified as an authorized user of the electronic device, access to the sensitive information on the remote server can be denied.

Figure 4:
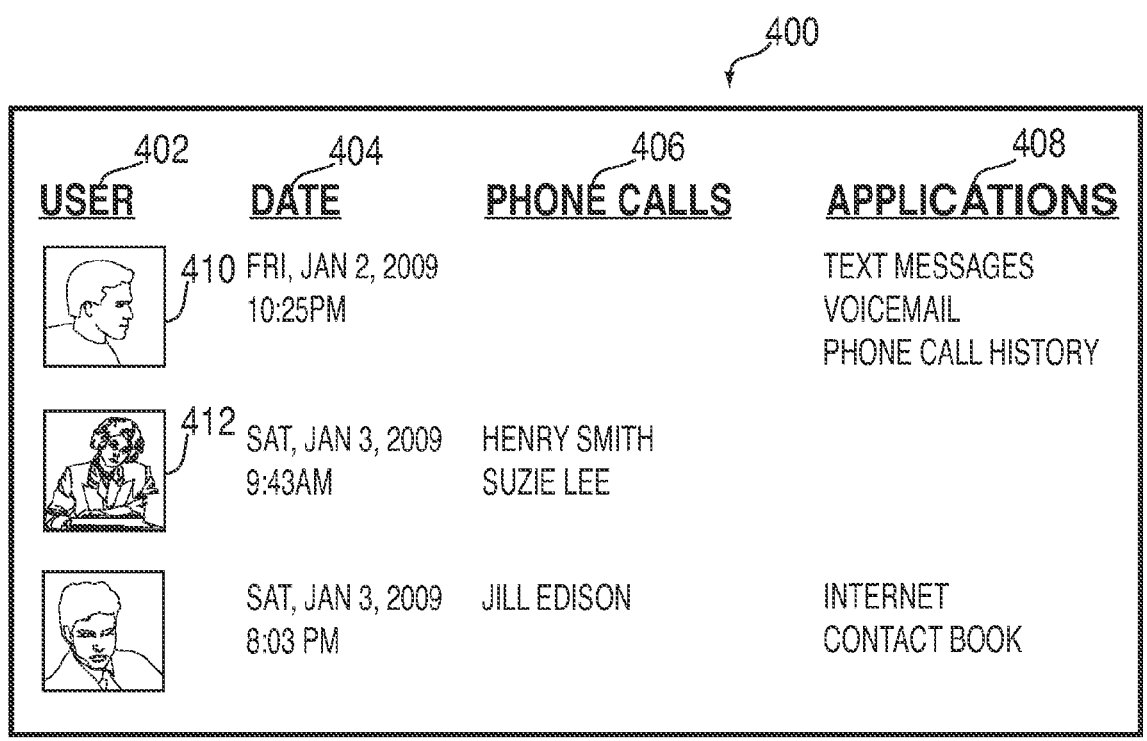
FIG. 4 shows an illustrative log of users of an electronic device in accordance with some embodiments of the present invention.
Figure 4:
Figure 4:

In some embodiments, information related to the current user's identity and the current user's operation of the electronic device can be gathered every time the electronic device is turned on, unlocked, or used. For example, information such as photographs of the current user, keylogs of his activities, or screenshots of the electronic device can be gathered. This can favorably allow a log of who is using the electronic device to be generated. In some embodiments, generating a log of users of an electronic device can aid an owner in determining if someone is "snooping" through or using their electronic device without permission. For example, FIG. 4 shows an illustrative log 400 of users of an electronic device such as, for example, a cellular phone.

Log 400 can include User Column 402 that can display the pictures taken of people who have used the cellular phone. For example, a camera, such as camera 120 of FIG. 1, can be configured to take a picture of the current user every time the electronic device is turned on, unlocked, or used. In some embodiments, log 400 can include Date Column 404 that can identify the time, date, or both of when a person uses the cellular phone, Phone Calls Column 406 that can identify any phone calls made, and Applications Column 408 that can identify any applications used on the cellular phone. For example, log 400 shows that the person identified by picture 410 used the cellular phone on January 2 and checked text messages, voicemails, and phone call history. As another example, the user identified by picture 412 used the cellular phone on January 3 and called Henry Smith and Suzie Lee. In some embodiments, log 400 can include screenshots from the electronic device that are taken while the person is using the cellular phone. Generating a log and taking photographs of a user every time an electronic device is used can beneficially reduce the need for complex algorithms. For example, since a person is photographed each time the electronic device is used, there may be no need for face recognition or voice recognition algorithms to determine whether or not the current user is an authorized user before photographing him.

When an unauthorized user is detected, various types of information can be gathered (e.g., information related to the identity of the current user, information related to the current user's operation of the electronic device, information related to the electronic device's location, or any combination of the above) and a responsible party can be notified with an "alert notification". In some embodiments, the alert notification can be a general message conveying that the electronic device is not in the possession of an authorized user. For example, a message such as, "Warning, your cellular phone may have been stolen" or "Your electronic device may be in the possession of an unauthorized user" can be sent to the responsible party. In some embodiments, the alert notification can include any of the information gathered when an unauthorized user is detected (e.g., photographs of the "thief," voice recordings, screenshots of the electronic device, keylogs, a listing of communication packets (e.g., Internet packets) served to the device, the electronic device's location, geotagged photographs, photographs of the surrounding area, or mode of transportation of the electronic device).

The "responsible party" can be any person or persons who are suitable to receive the alert notification. For example, the responsible party can be the owner of the electronic device. As another example, the responsible party can be the proper authorities or the police. As yet another example, the responsible party can be any person listed in a contact book stored in the electronic device. As yet another example, the responsible party can be a cellular phone carrier for the electronic device. In this case, when the phone carrier receives the alert notification, the phone carrier can, for example, shutdown any telephone service to the electronic device, shutdown the electronic device itself, or otherwise suitably restrict the functions of the electronic device. In some embodiments, the members of the responsible party can be chosen through user-controlled options, thus allowing the owner to select who can be notified when an unauthorized user is detected.

The alert notification can be sent to the responsible party through any suitable medium. For example, the alert notification can be sent via a phone call, voicemail, text message, facsimile message, or any combination of the above. As another example, the alert notification can be sent via a VoIP application (e.g., Skype™ or Windows™ Live Messenger), via an instant messaging application (e.g., AOL Instant Messenger™ or MSN Messenger™), as a message through an on-line profile (e.g., Facebook™ or Friendster™), as a message through an on-line blog (e.g., Twitter or Xanga™), or to a "cloud" server (e.g., to a MobileMe account associated with the owner of the electronic device). In some embodiments, the owner can define which mediums are used through user-controlled options. For example, the owner can choose one or more of the above-mentioned mediums and can assign which phone numbers, e-mail addresses, screen names, or other appropriate addresses are used.

Figure 5:
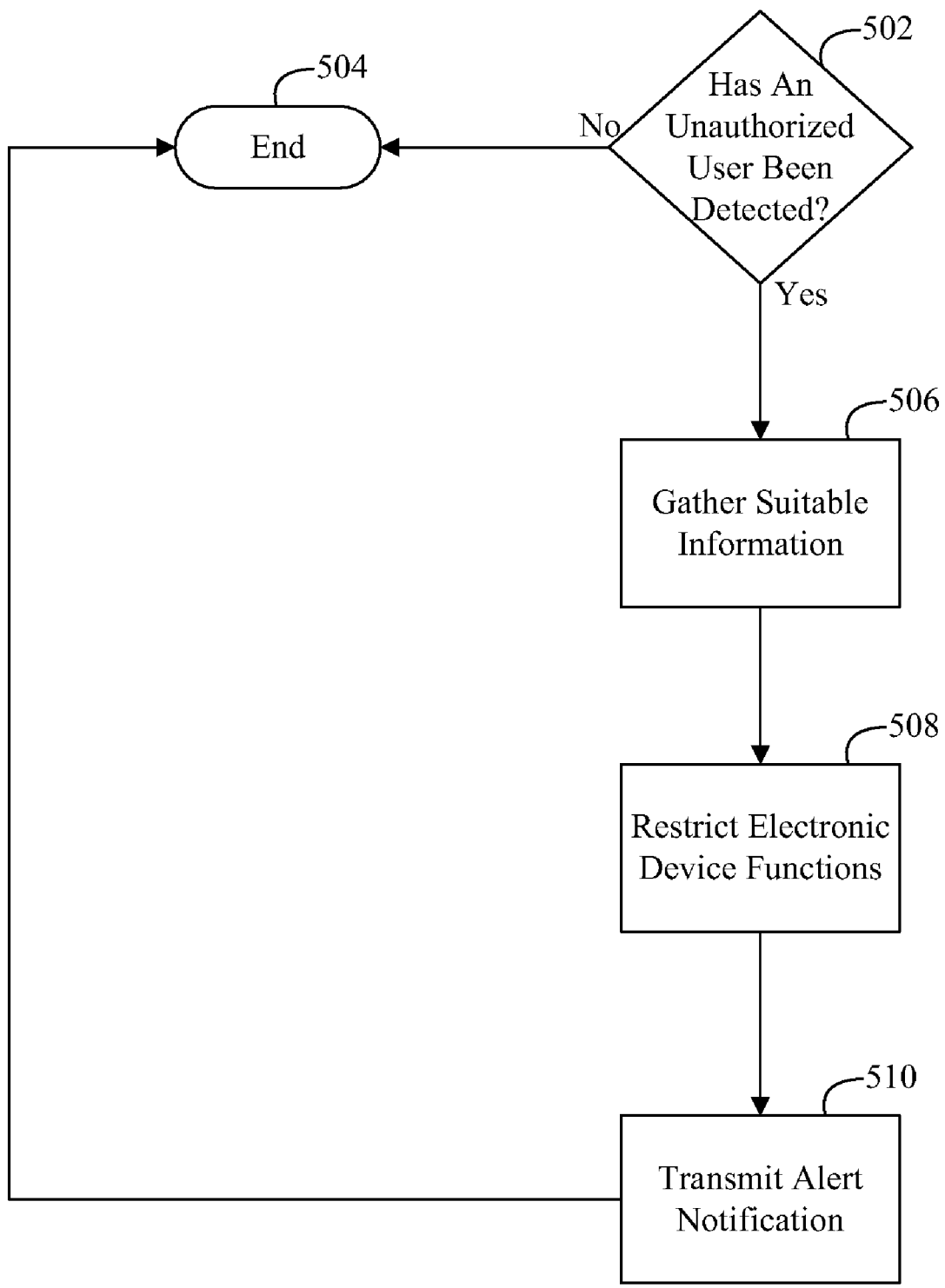
FIGS. 5-6b show illustrative processes for identifying unauthorized users of an electronic device in accordance with some embodiments of the present invention.

FIG. 5 shows illustrative process 500 for identifying unauthorized users of an electronic device. At step 502, the process determines whether an unauthorized user has been detected. Various processes that can detect an unauthorized user will be discussed in more detail in the descriptions to follow and in reference to FIGS. 6a and 6b. If an unauthorized user has not been detected, process 500 can end at step 504.

When an unauthorized user has been detected, any suitable information related to the electronic device, the current user of the electronic device (e.g., the unauthorized user), or both can be gathered at step 506. For example, as described above, information related to the current user's identity (e.g., the current user's photograph or voice recordings), operation of the electronic device (e.g., keylogs of any keystrokes, screenshots of the electronic device, any communication packets (e.g., Internet packets) served to the electronic device, or information related to a computer that has been coupled to the electronic device), location (e.g., location coordinates, geotagged photographs, photographs of the surrounding area), the mode of transportation of the electronic device, or any combination of the above can be gathered.

At step 508, functions of the electronic device can be restricted. For example, as described above, access to one or more applications or sensitive information can be restricted or prohibited, sensitive information can be erased or backed up on a remote server, or any combination of the above.

In some embodiments, step 506 can occur after step 508. In other embodiments, rather than both step 506 and step 508 occurring, only one of these steps may occur. In particular, the processes discussed herein are intended to be illustrative and not limiting, and one skilled in the art could appreciate that steps of the processes discussed herein can be omitted, modified, combined, rearranged, and any additional steps can be performed without departing from the scope of the invention.

At step 510, an alert notification is transmitted to the responsible party. As described above, the alert notification can be a general message (e.g., "Warning, your cellular phone may have been stolen"), can contain any of the information gathered at step 506, or any combination of the above. Also as described above, the alert notification can be transmitted through any suitable medium such as, for example, a voice mail, a phone call, a text message, a facsimile, through a VoIP application (e.g., Skype™ or Windows™ Live Messenger), through an instant messaging application (e.g., AOL Instant Messenger™ or MSN Messenger™), a message through an on-line profile (e.g., Facebook™ or Friendster™), a message through an on-line blog (e.g., Twitter or Xanga™), or through a "cloud" server (e.g., to a Mobile Me account associated with the owner of the electronic device).

Figure 6A:
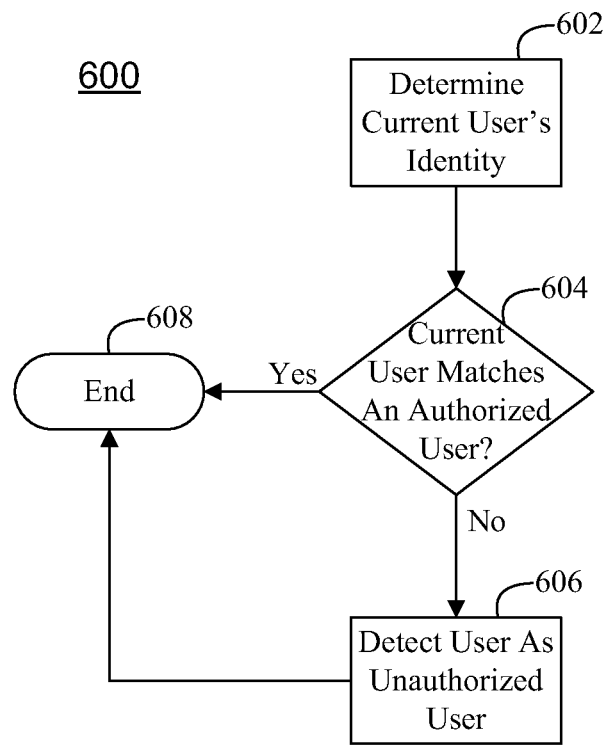
Figure 6B:
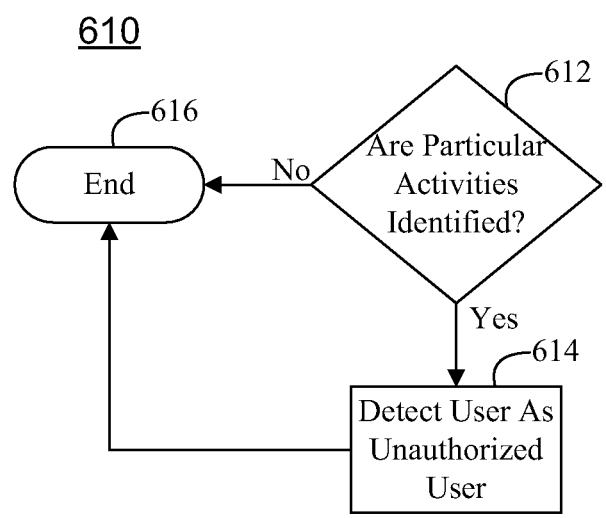

FIG. 6*a* and FIG. 6*b* show illustrative processes 600 and 610, respectively, that can each be used to detect an unauthorized user. For example, as described above, processes 600 and 610 can be implemented at step 502 of FIG. 5 to detect an unauthorized user.

Process 600 of FIG. 6*a* can determine the identity of a current user at step 602. For example, as described above, the current user can have his photograph taken, the current user's voice can be recorded, or an ECG of the current user's heartbeat can be recorded.

At step 604, process 600 can determine whether the current user matches an authorized user of the electronic device. For example, if a photograph of the current user was taken at step 602, this photograph can be compared to images stored in a database of authorized users. Similarly, if a voice recording of the current user was taken at step 602, this recording can be compared to voice recordings (e.g., voice prints) of authorized users stored in a database. As another example, if an ECG was taken at step 602, this ECG can be compared to the ECG of the owner of the electronic device (e.g., compared to the heart signature of the owner). If the current user does not match an authorized user, he can be detected as an unauthorized user at step 606. If, however, the current user does match an authorized user, process 600 can end at step 608.

To detect an unauthorized user, process 610 of FIG. 6*b* can determine whether particular activities are identified at step 612. As described above, the particular activities can include any activities indicating suspicious behavior such as, for example, entering an incorrect password a predetermined number of times in a row, entering an incorrect password a predetermined number of times within a period of time, hacking the electronic device, jailbreaking the electronic device, unlocking of the electronic device, removing a SIM card from the electronic device, moving the electronic device a predetermined distance from a synced device, or any combination of the above. If a particular activity is identified, the current user can be detected as an unauthorized user at step 614. If, however, a particular activity is not identified, process 610 can end at step 616.

The processes discussed above are intended to be illustrative and not limiting. Persons skilled in the art could appreciate that steps of the processes discussed herein can be omitted, modified, combined, rearranged, or combinations of these, and any additional steps can be performed without departing from the scope of the invention.

The above described embodiments of the present invention are presented for purposes of illustration and not of limitation, and the present invention is limited only by the claims which follow.

What is claimed is:

1. A method for identifying an unauthorized user of an electronic device, the method comprising:
monitoring with the electronic device usage of at least one memory of the electronic device;
detecting with the electronic device a sudden increase in the monitored memory usage; and
determining with the electronic device that a current user of the electronic device is the unauthorized user in response to the detecting.

2. The method of claim 1, wherein
the detecting comprises detecting that the monitored memory usage increases a particular amount within a predetermined period of time.

3. The method of claim 1, further comprising:
in response to the determining, gathering with the electronic device information regarding at least one operation of the electronic device.

4. The method of claim 3, further comprising, in response to the detecting, identifying with the electronic device that an unauthorized application is being run by the electronic device.

5. The method of claim 3, wherein the gathering further comprises gathering at least one of: at least one screenshot of the electronic device, keylogs, communications packets served to the electronic device, and information related to a host device that is coupled to the electronic device.

6. The method of claim 1, further comprising transmitting with the electronic device an alert notification to an external device in response to the determining.

7. The method of claim 3 further comprising transmitting with the electronic device the gathered information to an external device.

8. The method of claim 1, further comprising:
gathering information related to a location of the electronic device in response to the determining.

9. The method of claim 1, further comprising:
restricting with the electronic device at least one function of the electronic device in response to the determining.

10. The method of claim 1, further comprising:
transmitting with the electronic device sensitive data from the electronic device to a remote storage in response to the determining; and
erasing with the electronic device the sensitive data from the electronic device in response to the transmitting.

11. An electronic device operable to detect an unauthorized user of the electronic device, the electronic device comprising:
a memory; and
a processor operable to:
monitor a usage of the memory;
detect a sudden increase in the monitored usage; and
determine that a current user of the electronic device is the unauthorized user in response to the detection of the sudden increase.

12. The electronic device of claim 11, further comprising:
a microphone operable to record a voice of the current user, wherein the processor is operable to determine that the current user is the unauthorized user by:

comparing the recorded voice with at least one voice print of at least one authorized user of the electronic device; and determining that the recorded voice does not match the at least one voice print based on the comparison.

13. The electronic device of claim 11, further comprising:
a heartbeat sensor operable to detect at least one heartbeat of the current user, wherein the processor is operable to determine that the current user is the unauthorized user by:
comparing the detected at least one heartbeat with a heart signature of each authorized user of a plurality of authorized users of the electronic device; and
determining that the detected at least one heartbeat does not match the heart signature of any authorized user of the plurality of authorized users of the electronic device.

14. The electronic device of claim 11, further comprising:
an input device operable to receive an authenticating input for authenticating a user of the electronic device, wherein the processor is operable to determine that the current user is the unauthorized user by:
determining that a predetermined number of successive incorrect authenticating inputs have been received by the input device.

15. The electronic device of claim 11, further comprising:
a camera operable to capture photographs of a vicinity of the electronic device; and
positioning circuitry operable to determine current location information of the electronic device, wherein the processor is further operable to:
direct the camera to capture a photograph of the vicinity of the electronic device;
direct the positioning circuitry to determine the current location information; and
geotag the captured photograph by associating the captured photograph with the determined current location information.

16. The electronic device of claim 11, further comprising:
an accelerometer operable to record a vibration profile of the electronic device, wherein the processor is further operable to compare the recorded vibration profile with a library of vibration profiles to determine a current mode of transportation of the electronic device.

17. Non-transitory machine-readable media for identifying unauthorized users of an electronic device, comprising machine-readable instructions recorded thereon for:
monitoring with the electronic device usage of at least one memory of the electronic device;
detecting with the electronic device a sudden increase in the monitored usage; and
determining with the electronic device that a current user of the electronic device is an unauthorized user in response to the detecting.

18. The non-transitory machine-readable media of claim 17,
wherein the detecting comprises detecting that the monitored usage increases by a particular amount within a predetermined period of time.

19. The method of claim 4, wherein the identifying comprises identifying that a hacking program is being run on the electronic device.

20. The method of claim 6, wherein the alert notification comprises a message indicating that the unauthorized user has been detected.

21. The electronic device of claim 11, wherein the processor is operable to detect the sudden increase by detecting that the monitored usage increases by a particular amount within a predetermined period of time.

22. The electronic device of claim 11, wherein the processor is further operable to, in response to the detection of the sudden increase, identify that an unauthorized application is being run by the electronic device.

23. A method comprising:
determining with an electronic device that the electronic device is at least one of turned on and unlocked;
in response to the determining:
capturing with the electronic device at least one photograph of a current user of the electronic device; and
detecting with the electronic device at least one current operation that is being performed by the electronic device; and
storing with the electronic device the captured at least one photograph and the detected at least one current operation in a log of the electronic device.

24. The method of claim 23 further comprising:
analyzing with the electronic device the captured at least one photograph; and
determining with the electronic device an identity of the current user based on the analyzing.

25. The method of claim 23 further comprising presenting the log with the electronic device.

26. The method of claim 25, wherein the presenting comprises displaying at least the stored at least one photograph and the stored at least one current operation on a remote device remote from the electronic device.

27. The method of claim 23, wherein the detecting comprises detecting at least one call that is being made via the electronic device.

28. The method of claim 23, wherein the detecting comprises detecting at least one application of the electronic device that is being run on the electronic device.

29. The method of claim 23, wherein the detecting comprises recording at least one screenshot of the electronic device.

30. The method of claim 23, wherein the detecting comprises recording at least one user input that is received by an input unit of the electronic device.

* * * * *